United States Patent
Kim et al.

(10) Patent No.: US 11,129,190 B2
(45) Date of Patent: Sep. 21, 2021

(54) METHOD FOR PERFORMING RANDOM ACCESS PROCEDURE AND APPARATUS THEREFOR

(71) Applicant: LG Electronics Inc., Seoul (KR)

(72) Inventors: Jaehyung Kim, Seoul (KR); Joonkui Ahn, Seoul (KR); Changhwan Park, Seoul (KR); Seokmin Shin, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 74 days.

(21) Appl. No.: 16/496,370

(22) PCT Filed: Mar. 22, 2018

(86) PCT No.: PCT/KR2018/003324
§ 371 (c)(1),
(2) Date: Sep. 20, 2019

(87) PCT Pub. No.: WO2018/174577
PCT Pub. Date: Sep. 27, 2018

(65) Prior Publication Data
US 2021/0112590 A1    Apr. 15, 2021

Related U.S. Application Data

(60) Provisional application No. 62/475,207, filed on Mar. 22, 2017.

(51) Int. Cl.
*H04L 12/28*    (2006.01)
*H04W 74/00*    (2009.01)
(Continued)

(52) U.S. Cl.
CPC ........ *H04W 74/008* (2013.01); *H04B 1/7143* (2013.01); *H04L 1/1819* (2013.01);
(Continued)

(58) Field of Classification Search
CPC .. H04W 74/0833; H04W 76/27; H04W 72/14
(Continued)

(56) References Cited

U.S. PATENT DOCUMENTS

2012/0230291 A1* 9/2012 Han ...................... H04L 1/0072
370/329
2014/0321406 A1* 10/2014 Marinier ........... H04W 72/0413
370/329

(Continued)

FOREIGN PATENT DOCUMENTS

KR    1020130037382    4/2013
WO    WO2013095004    6/2013
(Continued)

OTHER PUBLICATIONS

International Search Report and Written Opinion in PCT Application No. PCT/KR2018/003324, dated Jul. 17, 2018, 21 pages (with English translation).
(Continued)

*Primary Examiner* — John Pezzlo
(74) *Attorney, Agent, or Firm* — Fish & Richardson P.C.

(57) ABSTRACT

The present invention relates to a method for performing a random access procedure in a wireless communication system and an apparatus therefor, the method comprising: a step of transmitting, to a base station, a random access preamble, wherein the random access preamble indicates an uplink data transmission in a Msg3 stage of the random access procedure; a step of receiving, from the base station, together with a random access response message including first uplink grant information, second uplink grant information for the uplink data transmission in the Msg3 stage; and a step of transmitting, to the base station, a radio resource control (RRC) connection request message with the first uplink grant information and performing data transmission with the second uplink grant information.

19 Claims, 12 Drawing Sheets

(51) Int. Cl.
*H04W 76/27* (2018.01)
*H04B 1/7143* (2011.01)
*H04L 1/18* (2006.01)
*H04W 72/04* (2009.01)
*H04W 72/14* (2009.01)
*H04W 74/08* (2009.01)
*H04J 1/16* (2006.01)

(52) U.S. Cl.
CPC ... *H04W 72/0446* (2013.01); *H04W 72/0453* (2013.01); *H04W 72/14* (2013.01); *H04W 74/0833* (2013.01); *H04W 76/27* (2018.02)

(58) Field of Classification Search
USPC .................................. 370/252, 278, 329, 386
See application file for complete search history.

(56) References Cited

U.S. PATENT DOCUMENTS

2014/0369297 A1    12/2014  Bertrand et al.
2018/0139778 A1*    5/2018  Chou .................... H04W 74/04
2018/0192439 A1*    7/2018  Tang .................... H04W 74/006

FOREIGN PATENT DOCUMENTS

WO    WO2017030412    2/2017
WO    WO2017031676    3/2017

OTHER PUBLICATIONS

3rd Generation Partnership Project; Technical Specification Group Radio Access Network, "Evolved Universal Terrestrial Radio Access (E-UTRA); Medium Access Control (MAC) protocol specification (Release 10)," 3GPP TS 36.321 V10.3.0, dated Oct. 3, 2011, 9 pages.
Ericsson, "On Two-step Random Access and Random Access Latency," R2-1700413, 3GPP TSG-RAN WG2 NR Ad hoc, Spokane, Washington, USA, dated Jan. 17-19, 2017, 6 pages, XP051210992.
Extended European Search Report in European Application No. 18771850.7, dated Aug. 26, 2020, 10 pages.
Huawei, HiSilicon, "NB-IOT—Random Access Procedure," R2-154509, 3GPP TSG-RAN WG2 #91 BIS, Malmo, Sweden, dated Oct. 5-9, 2015, 4 pages, XP051005056.
Samsung, "Data transfer in inactive state based on 4-step RACH procedures," R2-1701529, 3GPP TSG-RAN WG2 #97, Athens, Greece, dated Feb. 13-14, 2017, 7 pages, XP051212155.

* cited by examiner

FIG. 1
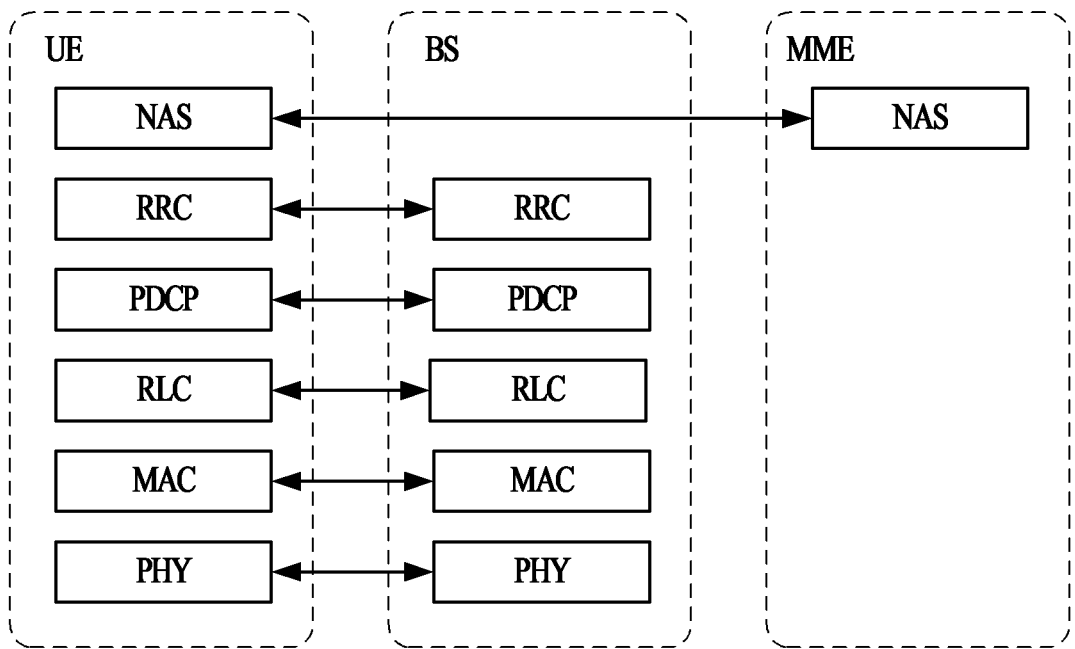
(a) Control plane protocol stack
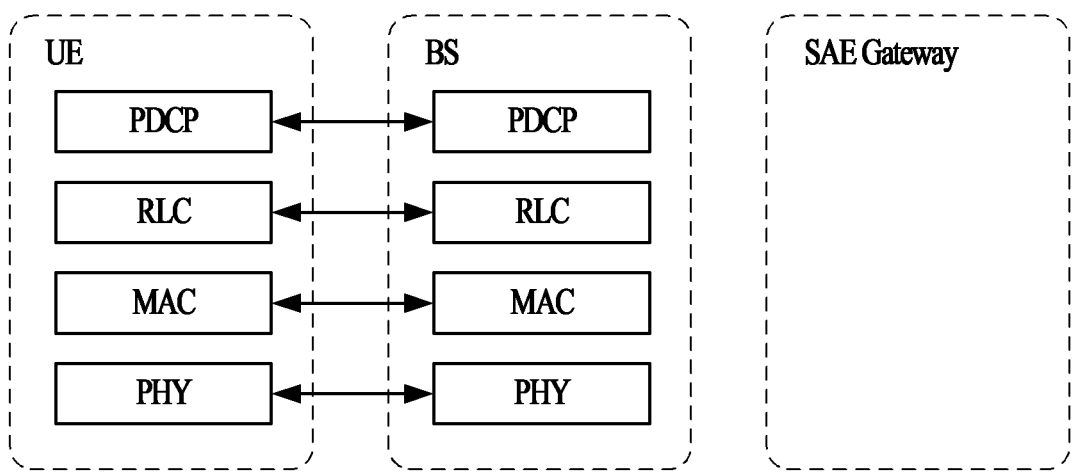
(b) User plane protocol stack

FIG. 11
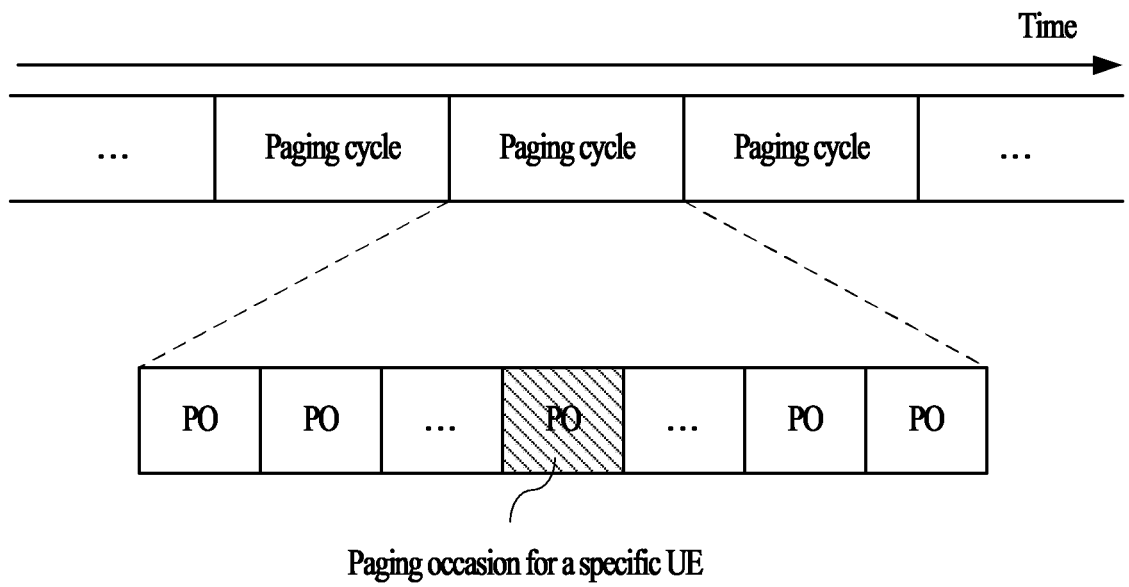
(a) Paging cycle
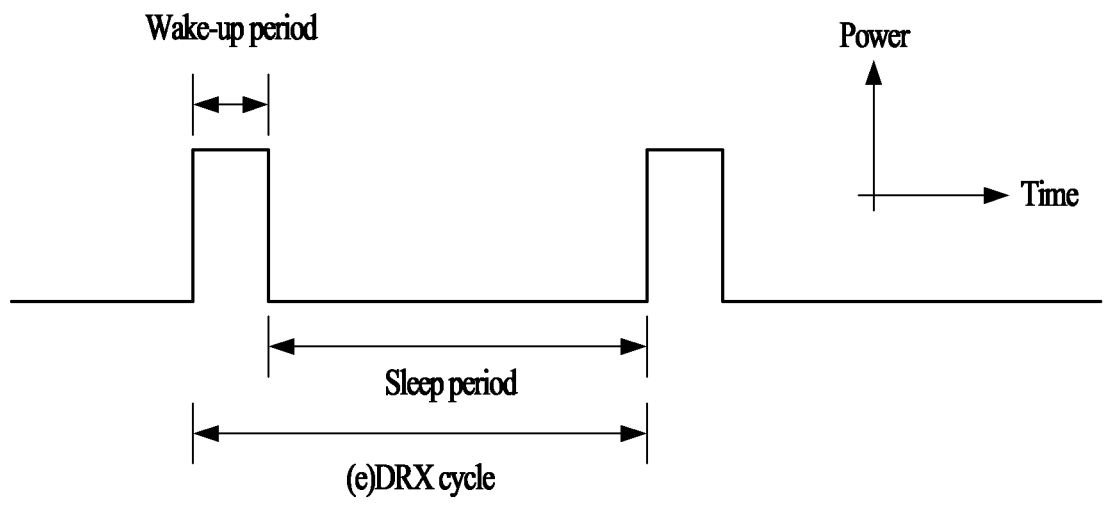
(b) (e)DRX cycle

METHOD FOR PERFORMING RANDOM ACCESS PROCEDURE AND APPARATUS THEREFOR

CROSS-REFERENCE TO RELATED APPLICATIONS

This application is a National Stage application under 35 U.S.C. § 371 of International Application No. PCT/KR2018/003324, filed on Mar. 22, 2018, which claims the benefit of U.S. Provisional Application No. 62/475,207, filed on Mar. 22, 2017. The disclosures of the prior applications are incorporated by reference in their entirety.

TECHNICAL FIELD

The present invention relates to a wireless communication system. More specifically, the present invention relates to a method and apparatus for performing a random access procedure for efficiently transmitting and receiving data.

BACKGROUND ART

When a new radio access technology (RAT) system is introduced, as more and more communication devices require larger communication capacity, there is a need for improved mobile broadband communication as compared to existing RAT. In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, considering enhanced mobile broadband communication (eMBB), massive MTC (mMTC), URLLC (Ultra-Reliable Low-Latency Communication), etc., the next generation wireless access technology is being discussed, and such a technology is referred to as new RAT (NR) for convenience.

DISCLOSURE

Technical Problem

An object of the present invention is to provide a method and apparatus for performing a random access procedure for efficiently transmitting and receiving data in a wireless communication system. Specifically, an object of the present invention to provide a method and apparatus for performing a random access procedure for efficiently transmitting and receiving uplink/downlink data in a wireless communication system that supports narrowband Internet of Things (NB-IoT) communication.

It will be understood by persons skilled in the art that the objects that can be achieved with the present invention are not limited to what has been particularly described hereinabove and other objects that the present invention can achieve will be more clearly understood from the following detailed description.

Technical Solution

In a first aspect of the present invention, provided herein is a method for performing a random access procedure by a user equipment in a wireless communication system, the method comprising: transmitting a random access preamble to a base station, wherein the random access preamble indicates an uplink data transmission in a Msg3 step during the random access procedure; and receiving, along with a random access response message including first uplink grant information, second uplink grant information for the uplink data transmission in the Msg3 step from the base station; and transmitting a Radio Resource Control (RRC) connection request message to the base station using the first uplink grant information and performing the uplink data transmission using the second uplink grant information.

In a second aspect of the present invention, provided herein is a user equipment for performing a random access procedure in a wireless communication system, the user equipment comprising: a Radio Frequency (RF) transceiver; and a processor operatively connected to the RF transceiver, wherein the processor is configured to: transmit a random access preamble to a base station, wherein the random access preamble indicates an uplink data transmission in a Msg3 step during the random access procedure, and receive, along with a random access response message including first uplink grant information, second uplink grant information for the uplink data transmission in the Msg3 step from the base station, and transmit a Radio Resource Control (RRC) connection request message to the base station using the first uplink grant information and perform the uplink data transmission using the second uplink grant information.

Preferably, transmitting the random access preamble may comprise indicating the uplink data transmission in the Msg3 step by transmitting the random access preamble using a pre-designated Physical Random Access Channel (PRACH) time resource and frequency resource.

Preferably, transmitting the random access preamble may comprise indicating the uplink data transmission in the Msg3 step by transmitting the random access preamble using a pre-designated Physical Random Access Channel (PRACH) frequency hopping pattern.

Preferably, transmitting the random access preamble may comprise indicating the uplink data transmission in the Msg3 step by transmitting the random access preamble using a pre-designated Physical Random Access Channel (PRACH) non-anchor Physical Resource Block (PRB).

Preferably, transmitting the random access preamble may comprise indicating the uplink data transmission in the Msg3 step by multiplying a preamble symbol or a preamble symbol group of the random access preamble by a pre-designated orthogonal cover code.

Preferably, transmitting the random access preamble may comprise indicating the uplink data transmission in the Msg3 step by partitioning a preamble sequence of the random access preamble.

Preferably, the transmission of the RRC connection request message and the uplink data transmission may be performed through a same Physical Uplink Shared Channel (PUSCH).

Preferably, the transmission of the RRC connection request message and the uplink data transmission may be performed through different Physical Uplink Shared Channels (PUSCHs).

Preferably, the random access response message and the second uplink grant information may be received through a Physical Downlink Control Channel (PDCCH) not involving a Physical Downlink Shared Channel (PDSCH).

Preferably, the random access response message and the second uplink grant information may be received through a Physical Downlink Shared Channel (PDSCH) not involving a Physical Downlink Control Channel (PDCCH).

Preferably, the method may further comprises receiving a RRC connection setup message from the base station; and when the RRC connection setup message does not include identification information of the user equipment, performing a Hybrid Automatic Repeat and Request (HARM) operation for the uplink data transmission.

Preferably, the method may further comprises, when the contention resolution message includes the identification information of the user equipment, entering an RRC-IDLE mode.

Advantageous Effects

According to the present invention, data may be efficiently transmitted and received through a random access procedure in a wireless communication system. Specifically, according to the present invention, data may be efficiently transmitted and received through a random access procedure in a wireless communication system that supports narrowband Internet of Things (NB-IoT) communication.

It will be understood by persons skilled in the art that the objects that can be achieved with the present invention are not limited to what has been particularly described hereinabove and other objects that the present invention can achieve will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 1 illustrates a control plane and a user plane of a radio interface protocol.

FIG. 11 illustrates a paging cycle and a DRX cycle.

MODE FOR INVENTION

Figure 2:
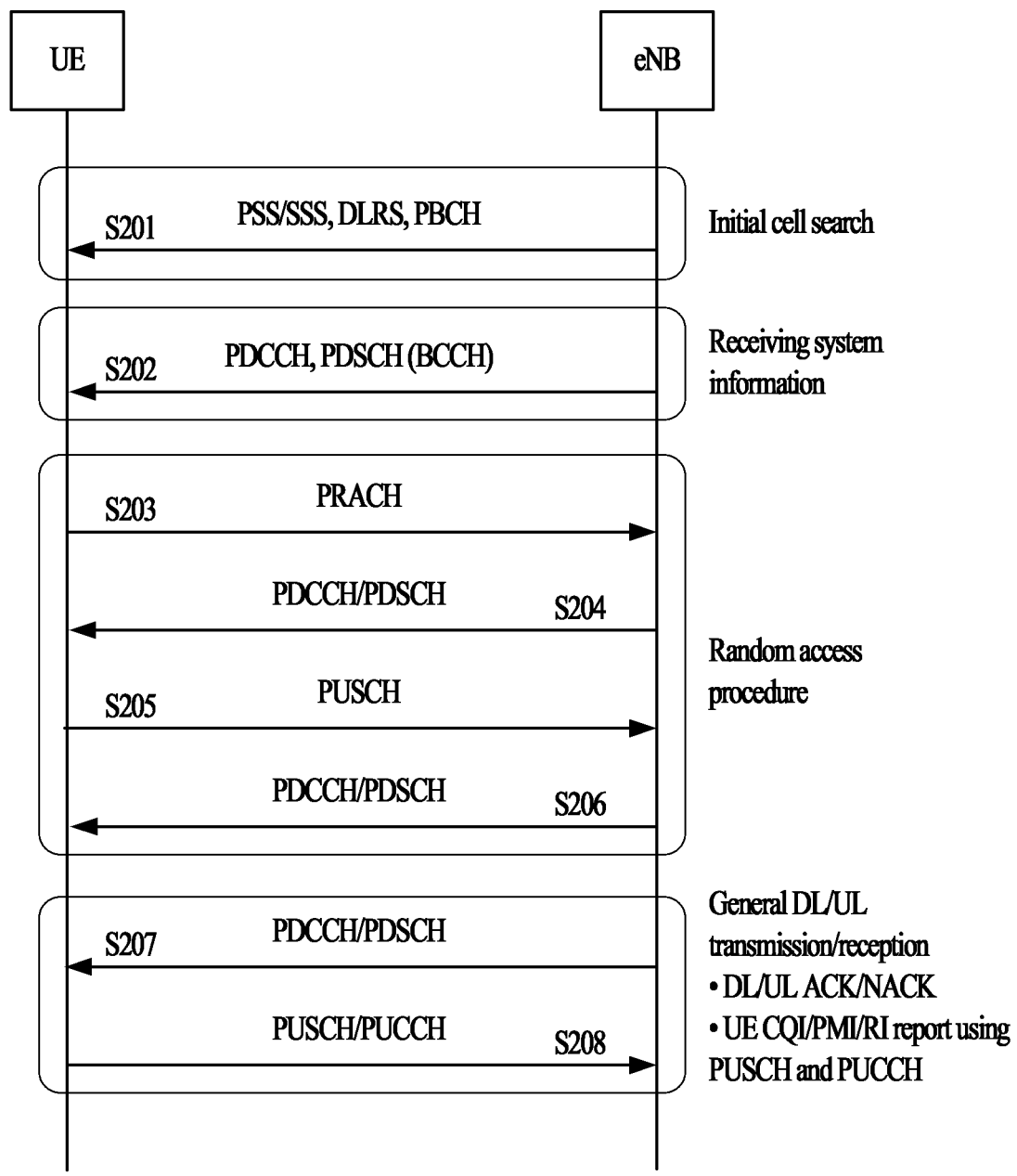
FIG. 2 illustrates physical channels and a general method for transmitting signals using the physical channels that may be used in the present invention.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access network (UTRAN) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRAN (E-UTRAN). UTRAN is a part of universal mobile telecommunications system (UMTS). 3rd generation partnership project (3GPP) long term evolution (LTE) is a part of E-UMTS (Evolved UMTS), which uses E-UTRAN. LTE-Advanced (LTE-A) is an evolved version of 3GPP LTE.

For clarity of explanations, the following description focuses on 3GPP LTE/LTE-A system. However, technical principles of the present invention are not limited thereto. Further, a particular terminology is provided for better understanding of the present invention. However, such a particular terminology may be changed without departing from the technical principles of the present invention. For example, the present invention may be applied to a system in accordance with a 3GPP LTE/LTE-A system as well as a system in accordance with another 3GPP standard, IEEE 802.xx standard, 3GPP2 standard, or a next-generation communication standard.

In the present specification, a user equipment (UE) may be fixed or mobile, and may be various kinds of equipment that transmit and receive data and/or control information to communicate with a base station (BS). The UE may be referred to as a terminal, mobile station (MS), mobile terminal (MT), user terminal (UT), subscribe station (SS), wireless device, personal digital assistant (PDA), wireless modem, handheld device, etc. In the present specification, a UE may be interchangeably referred to as a terminal.

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present specification, a base station (BS) may be interchangeably referred to as an eNB.

FIG. 1 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing a base station (eNB) is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

In a wireless access system, a user equipment (UE) may receive information from a base station (BS) in downlink (DL) and transmit information in uplink (UL). The information transmitted or received by the UE may include data and various control information. In addition, there are various physical channels according to the type or use of the information transmitted or received by the UE.

FIG. 2 illustrates physical channels and a general method for transmitting signals through the physical channels in the present invention.

When a UE is powered on or enters a new cell, the UE performs initial cell search in step S201. The initial cell search involves acquisition of synchronization to a base station. To this end, the UE synchronizes its timing to the base station and acquires information such as a cell identifier (ID) by receiving a primary synchronization signal (PSS) and a secondary synchronization signal (SSS) from the base station. Then the UE may acquire system information broadcasted in the cell through a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

To complete access to the base station, the UE may perform a random access procedure such as steps S203 to S206 with the base station. To this end, the UE may transmit a preamble through a physical random access channel (PRACH) (S203) and may receive a response message to the preamble through a PDCCH and a PDSCH associated with the PDCCH (S204). In the case of a contention-based random access, the UE may additionally perform a contention resolution procedure including transmission of an additional PRACH (S205) and reception of a PDCCH signal and a PDSCH signal corresponding to the PDCCH signal (S206).

After the above procedure, the UE may receive a PDCCH and/or a PDSCH from the base station (S207) and transmit a physical uplink shared channel (PUSCH) and/or a physical uplink control channel (PUCCH) to the base station (S208), in a general UL/DL signal transmission procedure. Information that the UE transmits to the base station is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted through a PUCCH periodically. However, if control information and traffic data should be transmitted simultaneously, they may be transmitted through a PUSCH. In addition, the UCI may be transmitted aperiodically through the PUSCH, upon receipt of a request/command from a network.

Figure 3:
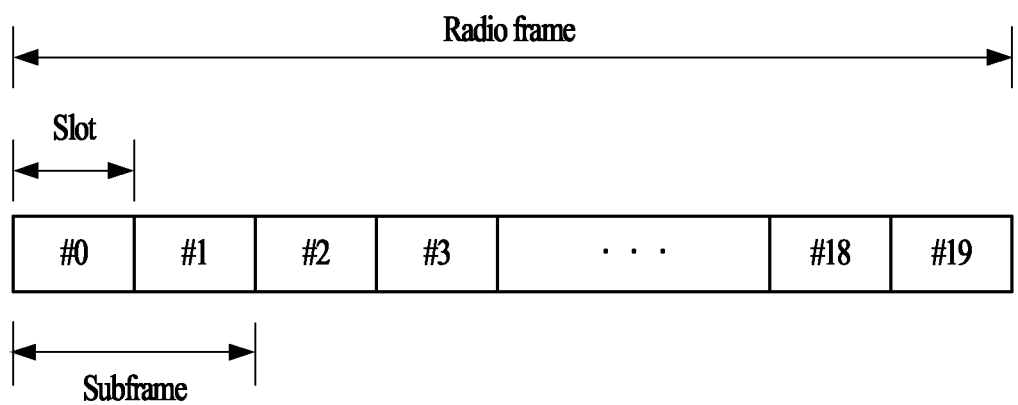
FIG. 3 illustrates a structure of a radio frame that may be used in the present invention.

FIG. 3 illustrates a structure of a radio frame that may be used in the present invention. In a cellular orthogonal frequency division multiplexing (OFDM) radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 3 illustrates the structure of the type-1 radio frame. For example, a downlink radio frame includes 10 subframes and one subframe includes two slots in a time domain. A time required to transmit one subframe is referred to as a transmission time interval (TTI). Or, TTI may refer to a time interval required to transmit one slot. For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol period. The OFDM symbol may be referred to as an SC-FDMA symbol or symbol period. A resource block (RB) as a resource allocation unit may include a plurality of consecutive subcarriers in one slot.

The number of OFDM symbols included in one slot may vary according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in a base station and to transmit a physical random access channel (PRACH) that carriers a random access preamble for uplink transmission synchronization. The GP is used to eliminate interference generated in uplink due to multi-path delay of a downlink signal between uplink and downlink.

The above-described radio frame structures are purely exemplary, and thus the number of subframes in a radio frame, the number of slots in a subframe, or the number of symbols in a slot may vary in different ways.

Figure 4:
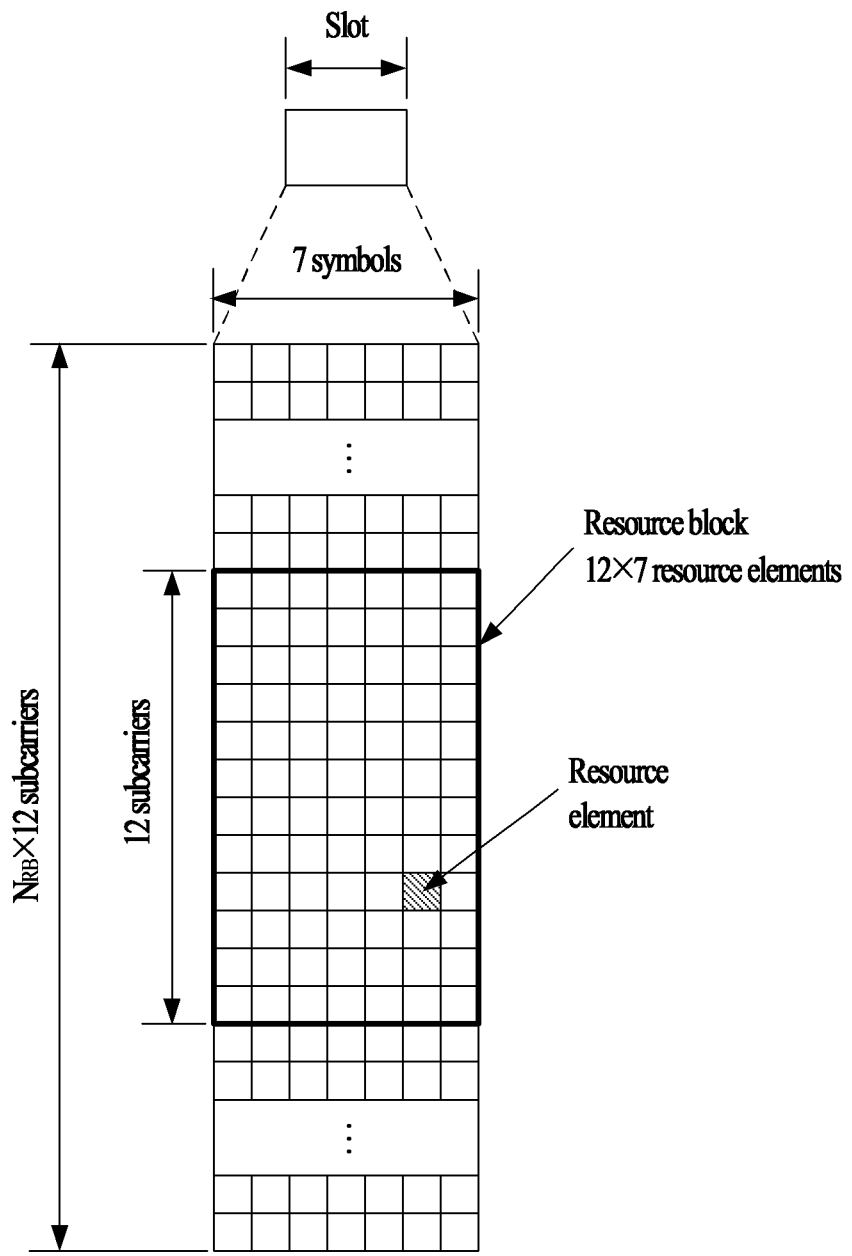
FIG. 4 illustrates a resource grid of a downlink slot that may be used in the present invention.

FIG. 4 illustrates a resource grid of one downlink slot that may be used in the present invention.

Referring to FIG. 4, a downlink slot includes a plurality of OFDM symbols in the time domain. One downlink slot may include 7 OFDM symbols and a resource block (RB) may include 12 subcarriers in the frequency domain. However, the present invention is not limited thereto. Each element of the resource grid is referred to as a Resource Element (RE). One RB includes 12×7 REs. The number of RBs in a DL slot, $N^{DL}$, depends on a downlink transmission bandwidth. An uplink slot may have the same structure as a downlink slot.

The above-described resource grid of a slot is exemplary, and thus the number of symbols, the number of resource elements, the number of RBs included in the slot may vary in different ways.

Figure 5:
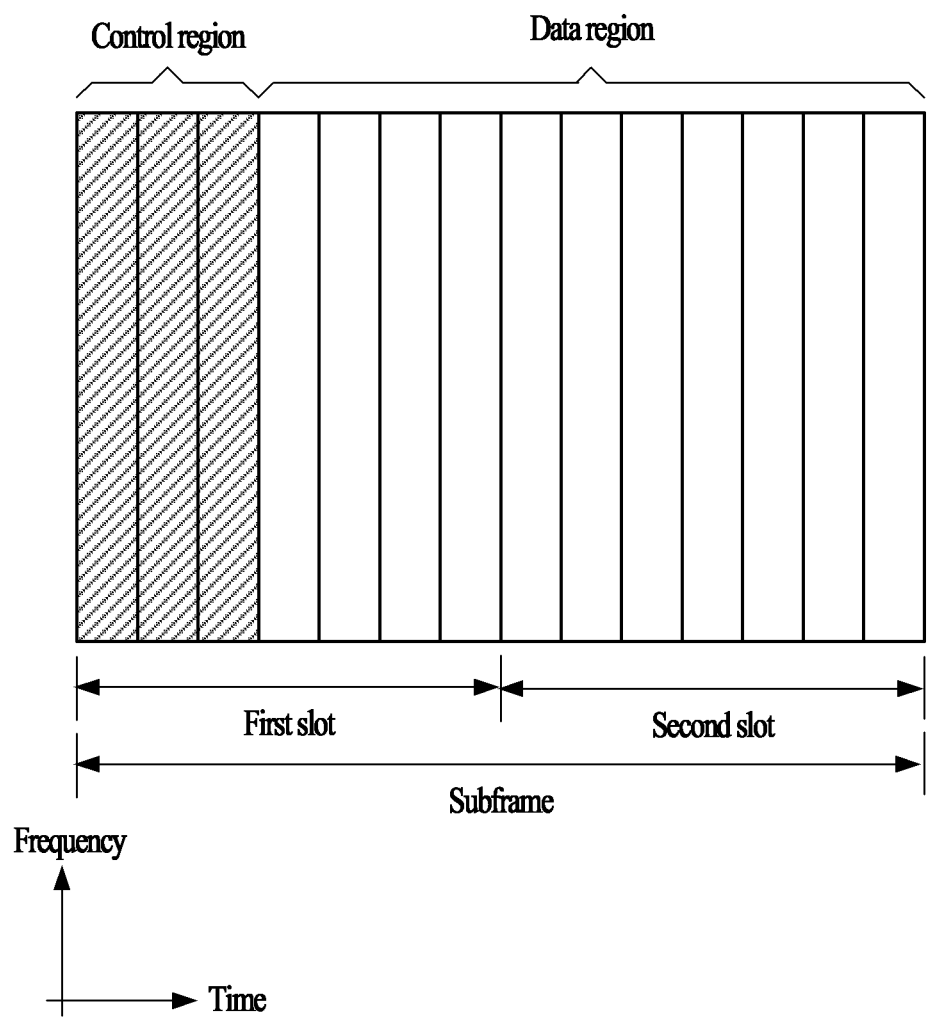
FIG. 5 illustrates a downlink subframe structure that may be used in the present invention.

FIG. 5 illustrates a downlink subframe structure that may be used in the present invention.

Referring to FIG. 5, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs), and each REG is uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ ACK/NACK signal. The PHICH is allocated on the remaining REGs other than CRS and PCFICH (a first OFDM symbol) in one or more OFDM symbols configured by PHICH duration. The PHICH is allocated to three REGs that are distributed if possible in the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MC S), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A base station determines a PDCCH format according to control information to be transmitted to a UE, and attaches a cyclic redundancy check (CRC) to the control information for error detection. CRC is masked with an identifier (e.g. radio network temporary identifier (RNTI)) according to an owner or usage of the PDCCH. In other words, PDCCH is CRC-scrambled with an identifier (e.g. RNTI).

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH. For example, in the case where the PDCCH is de-masked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in a search space for a specific UE, the remaining CCEs are not present. Thus, a base station may not find CCE resources in which the PDCCH is to be transmitted to all available UEs in a given subframe. In order to minimize the possibility that such blocking is subsequent to a next subframe, a start position of the USS is UE-specifically hopped.

Figure 6:
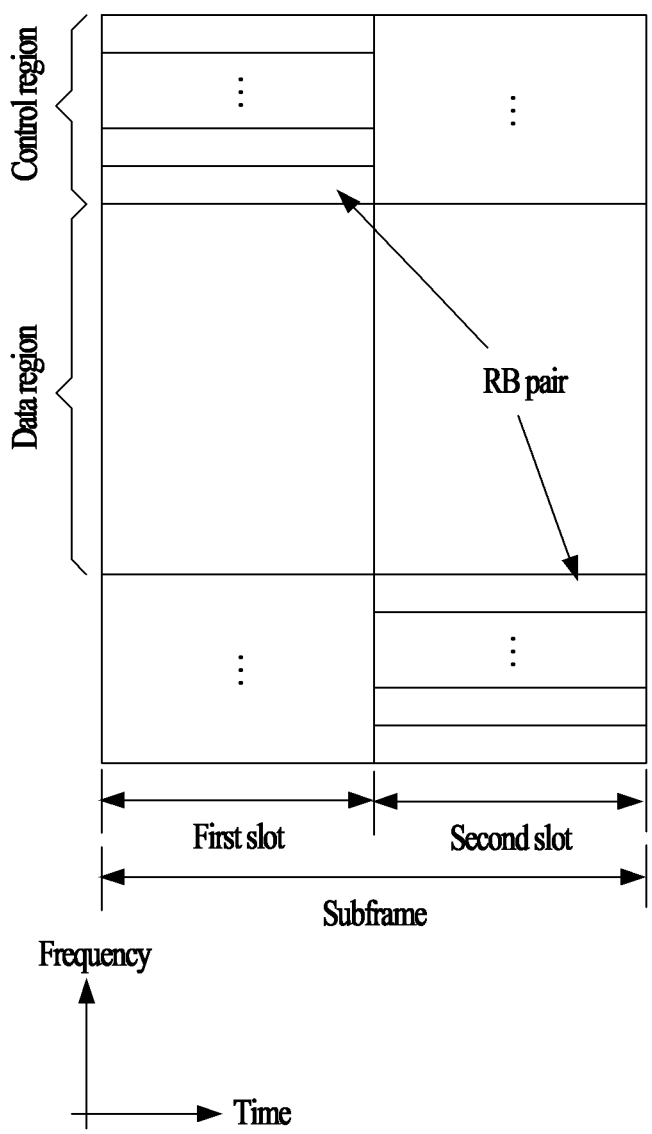
FIG. 6 illustrates an uplink subframe structure that may be used in the present invention.

FIG. 6 illustrates an exemplary structure of an uplink subframe that may be used in the present invention.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis, and performs hopping on the border of the slots.

The PUCCH may be used to transmit the following control information.

SR (Scheduling Request): information used to request uplink UL-SCH resource. The SR is transmitted using an on-off keying (OOK) scheme.

HARQ ACK/NACK: a response signal to the PDCCH indicating semi-persistent scheduling (SPS) release and a downlink data packet on the PDSCH. HARQ ACK/NACK represents whether the PDCCH indicating SPS release or the downlink data packet has been successfully received. ACK/NACK 1 bit is transmitted in response to a single downlink codeword (CW), and ACK/NACK 2 bits are transmitted in response to two downlink codewords.

CQI (Channel Quality Indicator): feedback information on a downlink channel. MIMO (Multiple Input Multiple Output) related feedback information includes a rank indicator (RI) and a precoding matrix indicator (PMI). 20 bits per subframe are used.

The above-described radio frame structures are purely exemplary, and thus the number of subframes in a radio frame, the number of slots in a subframe, or the number of symbols in a slot may vary in different ways.

Figure 7:
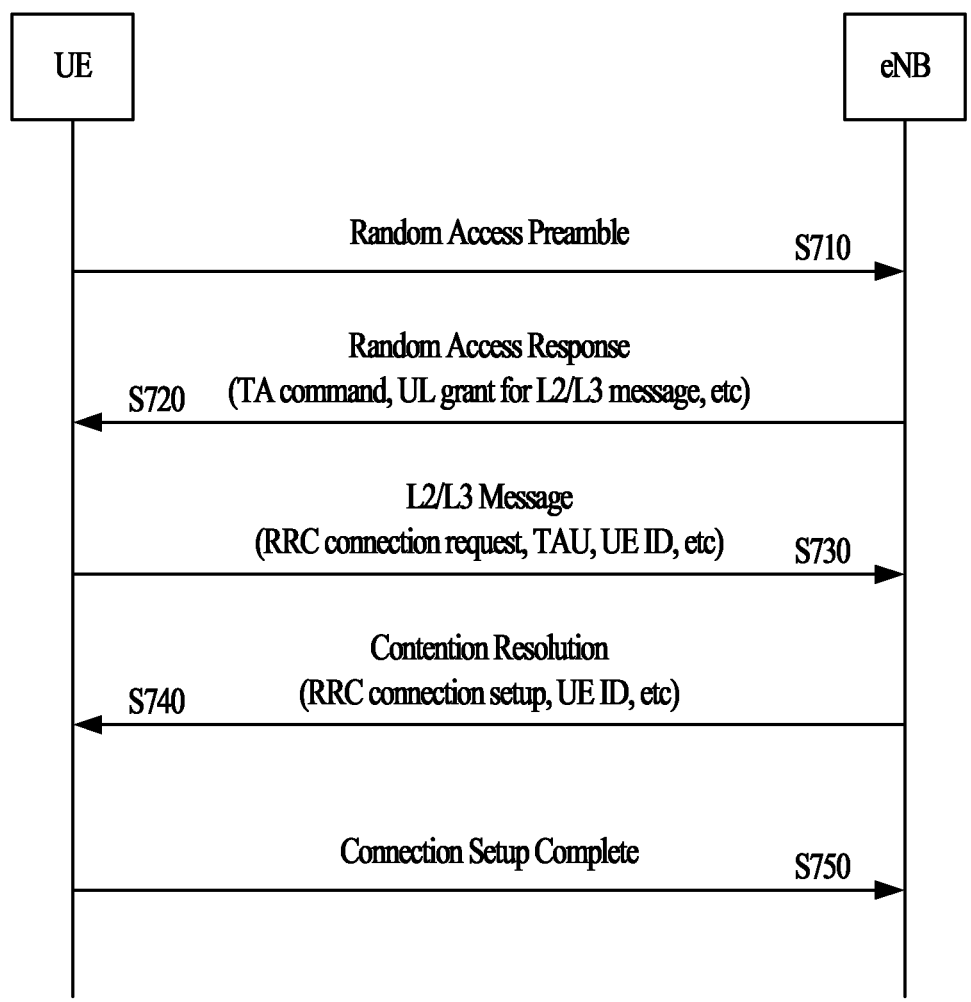
FIG. 7 illustrates a random access procedure.

FIG. 7 illustrates a random access procedure.

The random access procedure is used to transmit (short-length) data in uplink. For example, the random access procedure is performed upon initial access in an RRC IDLE state, upon initial access after radio link failure, upon handover requiring the random access procedure, and upon the occurrence of uplink/downlink data requiring the random access procedure during an RRC_CONNECTED state. Some RRC messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 7, a UE receives and stores information regarding random access from a base station through system information. Thereafter, when random access is needed, the UE transmits a random access preamble (referred to as Message 1 or Msg1) to the base station (S710). Upon receiving the random access preamble from the UE, the base station transmits a random access response message (referred to as Message 2 or Msg2) to the UE (S720). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3 or Msg3) including an RRC connection request message through an uplink Shared Channel (SCH) according to radio resource allocation information included in the response information (S730). After receiving the uplink message from the UE, the base station transmits a message for contention resolution (referred to as Message 4 or Msg4) to the UE (S740). The message for contention resolution may be referred to as a contention resolution message, and may include an RRC connection setup message. After the UE receives the contention resolution message, the UE transmits a connection setup complete message (referred to as Message 5 or Msg5) to the base station (S750).

In case of a non-contention based procedure, a base station may allocate a non-contention random access preamble to a UE before the UE transmits a random access preamble (S710). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S710. If the base station receives the non-contention random access preamble from the UE, the base station may transmit a random access response (referred to as Message 2) to the UE in a similar manner as S720.

During the above-described random access procedure, HARQ may not be applied to a random access response (S720), but HARQ may be applied to an uplink transmission for the random access response or a message for contention resolution. Thus, the UE does not have to transmit ACK/NACK in response the random access response.

A next generation of LTE-A system is considering to configure a user equipment (UE) at a low cost/low specification mainly focusing on data communication such as metering of a gauge meter, measurement of a water level, utilization of a monitoring camera, inventory report of a vending machine, and the like. Such a UE is to provide appropriate throughputs between connected devices even though it has a low complexity and consumes low power, and the UE is referred to as a machine type communication (MTC) UE or IoT (Internet of Things) UE for convenience, and the UE may be briefly referred to as a user equipment (UE).

Further, when the next generation system utilizes a cellular network or a third-party network, the next generation system can perform communication using a narrow band (or NB-IoT communication). For example, the narrow band may be 180 kHz. A UE (or NB-IoT UE) or an eNB transmits a single channel or a plurality of physical channels by multiplexing the channel(s) in a corresponding region. Meanwhile, the NB-IoT UE can perform communication even in such an area where channel environment is poor as under a bridge, under the sea, on the sea, and the like. In this case, in order to compensate for the poor channel environment, the NB-IoT UE may perform repetitive transmission on a specific channel (e.g., repetitive transmission during several TTIs) and/or perform power boosting. As an example of the power boosting, a region of a frequency resource to be transmitted on a specific band is more reduced to concentrate power per hour on a specific resource. For example, when a specific channel is transmitted via an RB (resource block) consisting of 12 REs, it may concentrate power to be distributed via the entire RB on a specific RE(s) by allocating the power to the specific RE instead of RE allocation in an RB unit. In particular, a scheme of performing communication by concentrating data and power on a single RE belonging to an RB is commonly referred to as a single-tone transmission scheme.

The physical channel for NB-IoT may be referred to by adding 'N', which represents narrowband, to the physical channel of the legacy system. For example, the PUSCH for NB-IoT may be referred to as a narrowband physical uplink shared channel (NPUSCH), the PRACH for NB-IoT may be referred to as a narrowband physical random access channel (NPRACH), and the PBCH for NB-IoT may be referred to as a narrowband physical broadcast channel (NPBCH), the PDCCH for NB-IoT may be referred to as a narrowband physical downlink control channel (NPDCCH), and the PDSCH for NB-IoT may be referred a narrowband physical downlink shared channel (NPDSCH). For simplicity, the NPUSCH, NPRACH, NPBCH, NPDCCH, and NPDSCH may be interchangeably used with PUSCH, PRACH, PBCH, PDCCH, and PDSCH, respectively. NB-IoT may be interchangeably used with cellular IoT (or cIoT).

The present invention is described based on UEs/base stations/systems supporting NB-IoT, but is not limited thereto. The present invention may also be applied to UEs/base stations/systems that do not support NB-IoT communication. For example, the present invention is applicable to a typical UE/base station/system that does not support IoT and MTC as well as a UE/base station/system supporting massive machine type communication (mMTC). In the present disclosure, the term UE/base station/system may collectively refer to a UE/base station/system supporting NB-IoT and a UE/base station/system that does not support NB-IoT.

Random Access Procedure for NB-IoT

The random access procedure for NB-IoT supports a 4-step contention-based random access procedure (or 4-step contention-based RACH procedure) similar to that of legacy LTE as described below. For example, the 4-step contention-based random access procedure may be performed through the operations described in FIG. 7 and the related section.

1) Msg1: Transmission of a random access (RA) preamble from the UE (for example, see step S710 of FIG. 7)

2) Msg2: Reception of a random access response (RAR) from the UE (e.g., see step S720 of FIG. 7). The RAR may include a timing advance (TA) command, and UL grant information for transmission of an L2/L3 message. The UL grant information may be used for (N)PUSCH transmission in the Msg3 step and may be referred to as (N)PUSCH grant information.

3) Msg3: Transmission of an L2/L3 message from the UE (e.g., see step S730 of FIG. 7). The L2/L3 message may include an RRC connection request, Tracking Area Update (TAU), and UE identification information (or UE ID).

4) Msg4: Reception of a contention resolution message by the UE (e.g., see step S740 of FIG. 7). The contention resolution message may include an RRC connection setup and UE identification information (or UE ID).

5) Msg5: Transmission of an RRC connection setup complete message from the UE (e.g., see S750 of FIG. 7). The RRC connection setup complete message may include Hybrid Automatic Repeat and Request Acknowledgement (HARQ-ACK) information about Msg4.

The standard specifications after 3rd Generation Partnership Project (3GPP) Release-13 support NB-IoT communication. In order to prevent the network load from being caused in NB-IoT communication, to support low-power and low-cost UEs, and to efficiently support intermittent data transmission, the standard specifications after 3GPP Release-13 support various standard technologies. For example, the standard specifications after 3GPP Release-13 support repetitive transmission of a physical channel for coverage enhancement or coverage extension with radio access technology between an NB-IoT UE and a base station, and also support core network optimization technology for intermittent data transmission and reception by an NB-IoT UE dedicated to voice-unsupported data as core network technology.

As an example, the core network optimization technology supports the following two types of random access procedures for NB-IoT, considering even system enhancement of the Evolved Packet System (EPS) for NB-IoT.

Control Plane EPS Optimization
1) Msg1: Transmission of an RA preamble
2) Msg2: RAR (including a TA command and Msg3 scheduling information)
3) Msg3: RRC connection request
4) Msg4: RRC connection setup
5) Msg5: RRC connection setup complete (including NAS PDU with data)

User Plane EPS Optimization
1) Msg1: Transmission of an RA preamble
2) Msg2: RAR (including TA command and Msg3 scheduling information)
3) Msg3: RRC connection resume request
4) Msg4: RRC connection resume
5) Msg5: RRC connection resume complete
6) (N)PUSCH (UL data): UL data transmission through PUSCH or NPUSCH When control plane EPS optimization is compared with user plane EPS optimization from the perspective of UL data transmission, the first UL data transmission may be performed in Msg5 in the case of control plane EPS optimization, and may be performed after Msg5 in the case of user plane EPS optimization.

In addition, from the perspective of repetitive transmission of a physical channel for coverage extension or coverage enhancement between an NB-IoT UE and a base station, an excessive latency may occur due to repetitive transmission of the physical channel. For example, in the case of UL transmission, repetitive transmission of the same signal may be performed up to 128 times, and a latency of about tens of seconds to several hundreds of seconds may occur until the transmission and reception of the UL data is completed. As another example, in the case of DL transmission, repetitive transmission of the same signal may be performed up to 2048 times. In this case, a latency of several tens of seconds to several hundred seconds may occur until the transmission and reception of DL data is completed.

Therefore, when an NB-IoT UE accesses a network through the conventional random access procedure and then performs data transmission and reception, an excessive latency may occur and power is required to be kept turned on for a long time due to the excessive latency. Accordingly, excessive power consumption may occur, which is a technical issue.

The present invention proposes a method for early transmission/reception of data through a random access procedure to address the technical issue described above. More specifically, the present invention is directed to a method for transmitting/receiving data early in a random access procedure in order to reduce latency and power consumption, which are main requirements for NB-IoT or massive machine type communication (mMTC). More specifically, as described above, in the conventional contention-based random access procedure, data transmission/reception is allowed only in or after Msg5. On the other hand, the present invention is intended to enable transmission/reception of UL data in or before Msg3 and transmission/reception of DL data in or before Msg4.

In the present disclosure, early UL data refers to UL data transmitted by a UE in or before Msg3 in a random access procedure, and early DL data refers to UL data transmitted before Msg4 in the random access procedure. In addition, in the present disclosure, DL HARQ-ACK refers to HARQ-ACK information transmitted from a UE to a base station for DL data, and UL HARQ-ACK refers to HARQ-ACK information transmitted from the base station to the UE for UL data.

Main scenarios considered in cellular IoT are described in detail in 3GPP Technical Report (TR) 45.820, which is incorporated herein by reference. The IoT traffic model defined in 3GPP TR 45.820 may be summarized as follows:

1) Mobile exception reports: used when a sensor reports occurrence of a specific event (fire/blackout/intrusion/disaster detection, etc.) to the base station (eNB);

2) Mobile periodic reports: used to periodically report the data (gas/water/electricity usage, etc.) measured by the sensor;

3) Network command: used for the application server to transmit a command instructing a UE to perform a specific operation (turning off light/reporting of measurement data) to the UE; and 4) Software (SW) update/reconfiguration: used when software update or patch transmission is needed for IoT devices In scenarios 1) and 2) among the main scenarios above, the UE initiate the scenarios and periodically or aperiodically reports UL data. In contrast, in scenarios 3) and 4), the base station (eNB) transmits DL data to the UE or commands the UE to report UL data. The present invention is directed to a method for transmitting DL data or additionally transmitting UL data during a random access procedure to reduce latency and power consumption in scenarios 3) and 4), which are initiated by the base station.

In order to effectively transmit and receive small packet data, the cellular IoT basically stays in a battery efficient state when there is no transmitted/received data, and transmits and receives data after switching to the RRC-CONNECTED state through the random access procedure when necessary. For example, in NB-IoT, the RRC-IDLE or RRC-SUSPENDED state corresponds to the battery efficiency state. As described above, in the case where data is transmitted and received after the random access procedure is completed as in the conventional cases, UL data is allowed to be transmitted and received in or after Msg5, and DL data is allowed to be transmitted and received after Msg5.

In order for the base station to transmit DL data to a UE that is in the battery efficient state (e.g., RRC-IDLE or RRC-SUSPENDED) or to make a request to the UE for UL data transmission, a paging occasion configured for the UE is used. Paging refers to an operation used to derive an RRC connection from the UE which is in the RRC-IDLE state or announce change in system information to the UE which is in the RRC-IDLE state. Since there is no way for the base station to access the UE when the UE is in the RRC-IDLE state, the UE checks, at regular intervals, whether a paging message is transmitted in a paging occasion (e.g., a specific subframe) configured by the base station. When the paging message is transmitted, the UE checks whether the paging message includes information about the UE identification (or UE ID) thereof (e.g., SAE Temporary Mobile Subscriber Identity (S-TMSI) or International Mobile Subscriber Identity (IMSI)). The position of a time interval (e.g., subframe) for monitoring paging information configured between the base station and the UE for paging is referred to as a paging occasion (PO). The position of the paging occasion, which is UE-specific information, is determined by IMSI, which is a unique number of the UE.

The base station may use a paging occasion to transmit DL data or make a request for UL data transmission to the UE, and indicates an RRC connection setup to the UE by transmitting a paging message including UE identification (or UE ID) of the UE in the paging occasion. When the UE receives the paging message including the UE identification information (or UE ID) in the paging occasion, the UE may set up the RRC connection by performing the random access procedure, and then transmit and receive DL/UL data. The present invention proposes methods for early UL data transmission/reception and/or early DL data transmission/reception in the respective steps of the random access procedure in order to reduce latency and power consumption when the base station transmits DL data or requests transmission of UL data by initiating the procedure.

Method 1: Transmission of Early UL Data in the Msg3 Step

As described above, according to the related art, even if the size of the data packet is small, the packet may be transmitted in uplink after the random access procedure is completed. Therefore, even when a small data packet is transmitted in uplink, excessive latency and power consumption may occur. In order to reduce the latency and power consumption that occur during transmission of a small data packet, the data may be transmitted in the Msg3 step in the random access procedure before the random access procedure is completed, in contrast with the related art.

In the present disclosure, the early UL data may refer to data of a higher layer. For example, the higher layer may be an RLC layer, a PDCP layer, or a higher layer (e.g., an application layer), and the early UL data may refer to user data for a higher layer. The early UL data may be delivered to the higher layer through a dedicated traffic channel (DTCH), which is a traffic channel.

Figure 8:
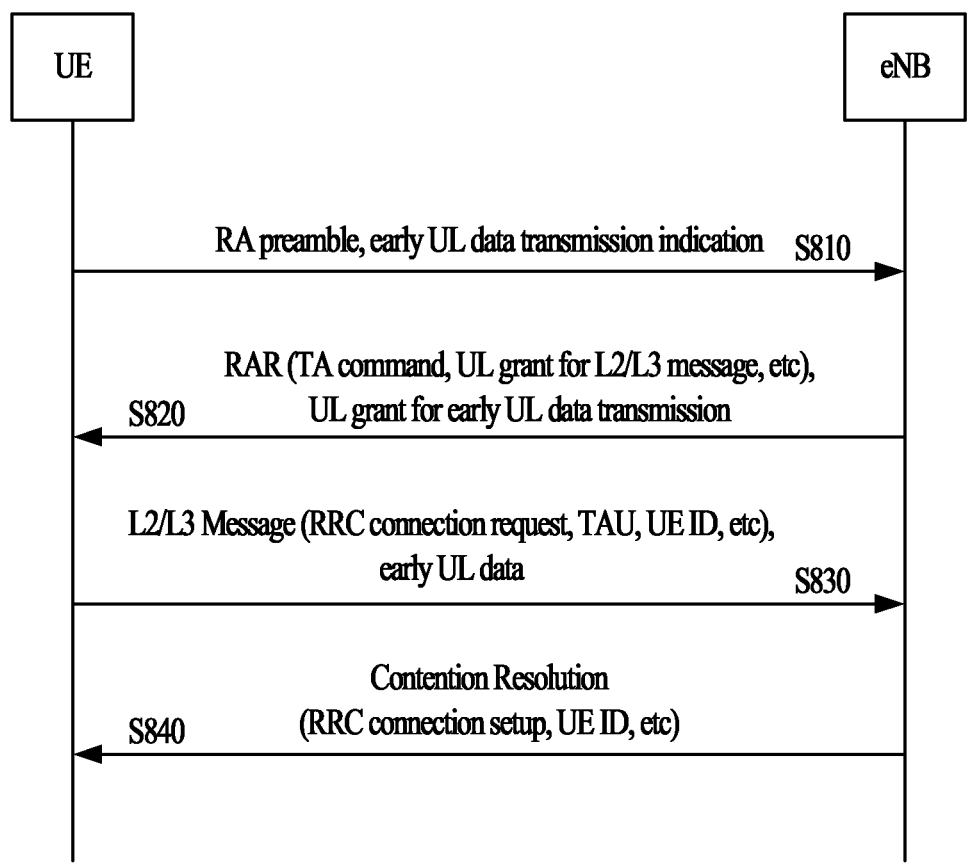
FIG. 8 to FIG. 10 illustrate random access procedures according to the present invention.

FIG. 8 illustrates a random access procedure for early UL data transmission in the Msg3 step according to the present invention.

In step S810, the UE may transmit a random access (RA) preamble.

In order for the UE to transmit UL data in the Msg3 step during the random access procedure, it is proposed that the UE may indicate to the eNB, in the Msg1 step (e.g., step S810) of the random access procedure, that early UL data transmission will be performed. The present invention proposes various methods for the UE to indicate early UL data transmission in the Msg3 step to the eNB in the Msg1 step.

The indication may be distinguished by a time/frequency resource of PRACH or NPRACH. For example, it may be distinguished by a start point or region (in an OFDM symbol or subframe unit) in the time domain for transmitting the (N)PRACH, or by a start point or region (in an RB or subcarrier unit) in the frequency domain. The UE may indicate early UL data transmission in the Msg3 step by transmitting an (N)PRACH preamble using the time/frequency resources separated by pre-dividing the time/frequency resources between the UE and the eNB (which is referred to as Opt1 for simplicity).

Additionally or alternatively, it may be distinguished by a frequency hopping pattern. The NPRACH may be transmitted within the number of subcarriers indicated through system information (e.g., System Information Block Type 2 (SIB2)), and the transmission position in the frequency domain may hop on a subcarrier-by-subcarrier basis according to a predetermined rule. By performing frequency hopping of the NPRACH transmission position according to a frequency hopping pattern predetermined between the UE and the base station, early UL data transmission in the Msg3 step may be indicated (which is referred to as Opt2 for simplicity).

Additionally or alternatively, in the case of NB-IoT, specific non-anchor Physical Resource Block(s) (PRB(s)) may be distinguishably allocated to an NPRACH transmission region for indicating early UL data transmission. In the case of NB-IoT, a synchronization signal (a Narrowband Primary Synchronization Signal (NPSS), a Narrowband Secondary Synchronization Signal (NSSS)) and the NPBCH may be allowed to be transmitted only in a specific PRB. The specific PRB may be referred to as an anchor PRB. At least one of the non-anchor PRBs may be pre-designated. By transmitting an NPRACH in the pre-designated non-anchor PRB, early UL data transmission in the Msg3 step may be indicated (which is referred to as Opt3 for simplicity).

Additionally or alternatively, the indication may be distinguished by multiplying each preamble symbol or preamble symbol group by an orthogonal cover code. The NPRACH preamble may consist of a cyclic prefix (CP) and a sequence part, wherein the sequence part may consist of five subblocks. Each subblock is referred to as a preamble symbol, and the NPRACH preamble including the CP and the five preamble symbols is referred to as a preamble symbol group. For example, early UL data transmission in the Msg3 step may be indicated by multiplying a preamble symbol or preamble symbol group by an orthogonal cover code (e.g., an (orthogonal) signal such as "101010 . . . ") predetermined on a symbol-by-symbol basis or a symbol group-by-symbol group basis (which is referred to as Opt4 for simplicity).

Additionally or alternatively, the indication may be distinguished by partitioning the preamble sequence (which is referred to as Opt5 for simplicity).

The above-described methods (e.g., Opt1 to Opt5) may be applied even to a method of additionally transmitting a few bits using a random access preamble for another purpose. For example, in the case of Opt1, a plurality of time/frequency resources for (N)PRACH transmission may be pre-designated such that each the pre-designated time/frequency resources represents one bit. Similarly, in the case of Opt2, a plurality of frequency hopping patterns may be pre-designated such that each of the pre-designated frequency hopping patterns represents one bit. In the case of Opt3, a plurality of non-anchor PRBs may be pre-designated such that each of the pre-designated non-anchor PRBs represents one bit. In the case of Opt4, a plurality of orthogonal cover codes may be pre-designated such that each of the pre-designated orthogonal cover codes represents one bit.

Additionally or alternatively, at least N Opts of Opt1 to Opt5 may be combined to represent at least N bits or N-bit information. For example, when Opt1 and Opt2 are combined, one bit may be presented depending on whether Opt1 is used for (N)PRACH transmission, and another bit may be presented depending on whether Opt2 is used for (N)PRACH transmission. Thereby, at least two bits may be transmitted. For example, when (N)PRACH is transmitted using a pre-designated time/frequency resource according to Opt1, one bit value may be interpreted as 1 (or 0). When (N)PRACH is transmitted using a pre-designated frequency hopping pattern according to Opt2, the other bit value may be interpreted as 1 (or 0). Thus, two-bit information may be additionally transmitted using a random access preamble.

The present invention is applicable even to cases where other combinations of Opt1 to Opt5 are used.

Referring back to FIG. 8, in step S820, the base station may transmit a RAR (RAR) message. The RAR message may include a timing advance (TA) command and UL grant information for the L2/L3 message in the Msg3 step. In the present disclosure, the UL grant information for the L2/L3 message in the Msg3 step may be referred to as first UL grant information.

It is proposed that when the UE transmits an early UL data transmission indication to the eNB in the Msg1 step, the eNB additionally transmit UL grant information for the early UL data transmission in the Msg2 step (e.g., step S820) to allow the UE to transmit UL data in addition to the L2/L3 message in the Msg3 step. In the present disclosure, the UL grant information for the early UL data transmission may be referred to as second UL grant information.

Two methods may be considered for transmitting early UL data in the Msg3 step (e.g., step S830). First, the data may be transmitted through the same PUSCH as the L2/L3 message. Second, a PUSCH independent or different from the L2/L3 message may be allocated to the transmission. In the first method, the same power/repetition number/resource unit (RU) as the L2/L3 message are used. In the second method, for early UL data, a PUSCH region and power/repetition number/RU independent (or different) from the L2/L3 message may be configured. The RU may include an indication of whether the transmission is a single-tone transmission or a multi-tone transmission. In this case, the eNB may configure the power/repetition number/RU and resource allocation for the L2/L3 message and the early UL data based on the entirety or part of a coverage level (which may be referred to as a coverage enhancement level or coverage extension level and may correspond to the number of repetitive transmissions), the UE capability, the size of the early UL data, and the like. More specifically, interpretation of the field of (N)PUSCH scheduling information transmitted through Msg2 may vary depending on whether the UE has indicated early UL data transmission. For example, if the UE has indicated early UL data transmission, a larger transport block size (TBS), a larger number of RBs, a larger repetition number, a higher modulation order, and the like may be configured for the field values of the same scheduling information.

When the UE transmits an early UL data transmission indication to the eNB in the Msg1 step (e.g., step S810), the eNB may additionally transmit UL grant information for the early UL data transmission or reject the early UL data transmission in the Msg2 step (e.g., step S820). When the eNB rejects the early UL data transmission, the eNB may transmit a rejection signal to the UE in the Msg2 step, and the UE may stop the early UL data transmission or perform a normal random access procedure to transmit UL data after RRC connection. The eNB may determine whether to allow early UL data transmission by referring to the Reference Signal Received Power (RSRP) information measured by the UE, a coverage level, resources available to the eNB, and traffic load. In the Msg2 step, the signal of the eNB to reject the early UL data transmission may be transmitted to the UE using an RNTI or a reserved bit of the DCI in the NPDCCH, or by adding a flag to the RAR message.

In the Msg2 step, the conventional RAR message may be received only when both the (N)PDCCH and the (N)PDSCH are decoded, which is a cause of latency or power consumption considering that the (N)PDCCH and (N)PDSCH are repeatedly transmitted. In order to reduce the latency and power consumption in the Msg2 step, the RAR message (and/or UL grant information for the early UL data transmission) may be transmitted only through the (N)PDCCH or (N)PDSCH. A transmission only through the (N)PDCCH may refer to a transmission without involving the (N)PDSCH, and a transmission only through the (N)PDSCH may refer to a transmission without involving the (N)PDCCH. In the case where the Msg2 step is performed only through the (N)PDCCH, it is proposed that the UE perform blind detection (BD) without any special indication, or transmitting Msg2 only through the (N)PDCCH be indicated in the Msg1 step to avoid BD.

Specifically, the UE may indicate to the eNB that the Msg2 step is to be performed only through the (N)PDCCH, using the same method as the method (e.g., Opt1 to Opt5) by which the UE indicates the early UL data transmission of Msg3 to the eNB in the Msg1 step. Alternatively, RRC configuration information may be used to indicate that the Msg2 step is to be performed only through the (N)PDCCH. When the RRC configuration information is used, the RRC connection may be performed in the initial access procedure by the conventional method of using both the (N)PDCCH and the (N)PDSCH. Then, the information may be stored and Msg2 transmission may be performed only through the (N)PDCCH.

When Msg2 transmission is to be performed only through the (N)PDSCH, information necessary for decoding, such as MCS information and resource allocation information about the (N)PDSCH in the Msg2 step, may be received through RRC configuration information and used. As in the case of performing Msg2 transmission only through the (N)PDCCH, the UE may indicate, to the eNB that Msg2 transmission is performed only through the (N)PDSCH, in the Msg1 step.

Referring back to FIG. 8, the UE may transmit an L2/L3 message in step S830. The L2/L3 message in step S830 may include an RRC connection request message, and UE identification information (or UE ID) may be transmitted to the eNB through the RRC connection request message. For example, the UE identification information (or UE ID) may include a random number.

In the Msg3 step (e.g., step S830), the UE transmits early UL data along with the L2/L3 message. The early UL data is transmitted using the UL grant information for the early UL data received in the Msg2 step (e.g., step S820). The UE configures power/repetition number/RU according to the UL grant information and transmits the data using a resource allocated thereto. In this method, the eNB determines scheduling information.

As another method, a UE may autonomously configure scheduling information. Based on the coverage level calculated by the receiver with a method such as RSRP, the UE capability (indicating whether multi-tone transmission is supported), and the size of early UL data, the UE may set the power/repetition number/RU and determine whether to use multi-tones, performing resource allocation to transmit Msg3. To this end, the UE may indicate the Msg3 transmission method determined by the UE to the eNB in the Msg1 step (e.g., S810), and the eNB may transmit UL grant information to the UE in the Msg2 step (e.g., S820) according to the indication transmitted from the UE.

Referring back to FIG. 8, in step S840, the eNB may transmit a contention resolution message. The contention resolution message in step S840 may include an RRC connection setup message, and UE identification information (or UE ID) may be transmitted through the RRC connection setup message. For example, the UE identification information (or UE ID) may include UE identification information (or UE ID) transmitted in step S830.

Once the UE transmits the early UL data in step S830, the eNB may decode the early UL data. If the eNB succeeds in decoding, it may replace the UL HARQ-ACK by transmitting a contention resolution message including UE identification information (or UE ID) to the UE in the Msg4 step (e.g., S840 step). When the UE receives the information indicating its UE identification (or UE ID) in the Msg4 step, the UE returns to RRC-IDLE/RRC-SUSPENDED, considering that the UL data transmission is successful, and waits until the next UL data generation in order to reduce power consumption.

If the UE does not receive the UE identification (or UE ID) thereof in the Msg4 step (e.g., S840), it may perform HARQ operation (e.g., HARQ retransmission). In the contention-based random access procedure, HARQ operation may continuously undergo collision in the Msg3 step due to limited (N)PRACH resource allocation, which may be an issue in terms of latency or power consumption. To address this issue, the following Msg3 HARQ collision resolution method is proposed. When colliding UEs perform retransmission after the eNB pre-allocates a plurality of resources, the UEs may select resources within the allocated resources at random or according to a certain rule based on the UE identification information (or UE ID), and then perform retransmission using the selected resources. For example, as the UE identification information (or UE ID), the UE identification information (or UE ID) transmitted in step S830 may be used. In this case, repeated failure in Msg3 reception due to persistent collision during retransmission may be avoided. A plurality of resources pre-allocated for Msg3 HARQ collision resolution may be resources pre-agreed between the eNB and the UEs, or may be configured through SIB information. Alternatively, the plurality of resources pre-allocated for Msg3 HARQ collision resolution may be configured through the Msg2 step.

Method 2: Early UL Data Transmission in Msg3/Msg5 Step

In Method 1 according to the present invention, in order to reduce latency and power consumption in transmitting a small data packet in uplink, it is proposed that data to be transmitted in the Msg3 step of the random access procedure earlier than in the case of the conventional random access procedure. In the case of Method 1, when data to be transmitted in the Msg3 step is larger in size than the resource allocated by the UL grant information for early UL data received in the Msg2 step, not all the early UL data may be transmitted through the Msg3. Thus, in Method 2 according to the present invention, in order to apply Method 1 even to large data packets, a portion of the early UL data (referred to as first UL data for simplicity) is transmitted in the Msg3 step, and additional UL data (referred to as second UL data for simplicity) is transmitted in or after the Msg5 step.

In the present disclosure, like the early UL data, the first UL data and the second UL data may refer to data of a higher layer. For example, the higher layer may be an RLC layer, a PDCP layer, or a higher layer (e.g., application layer), and the first UL data and the second UL data may refer to user data for a higher layer. The first UL data and the second UL data may be delivered to a higher layer through a dedicated traffic channel (DTCH), which is a traffic channel.

Figure 9:
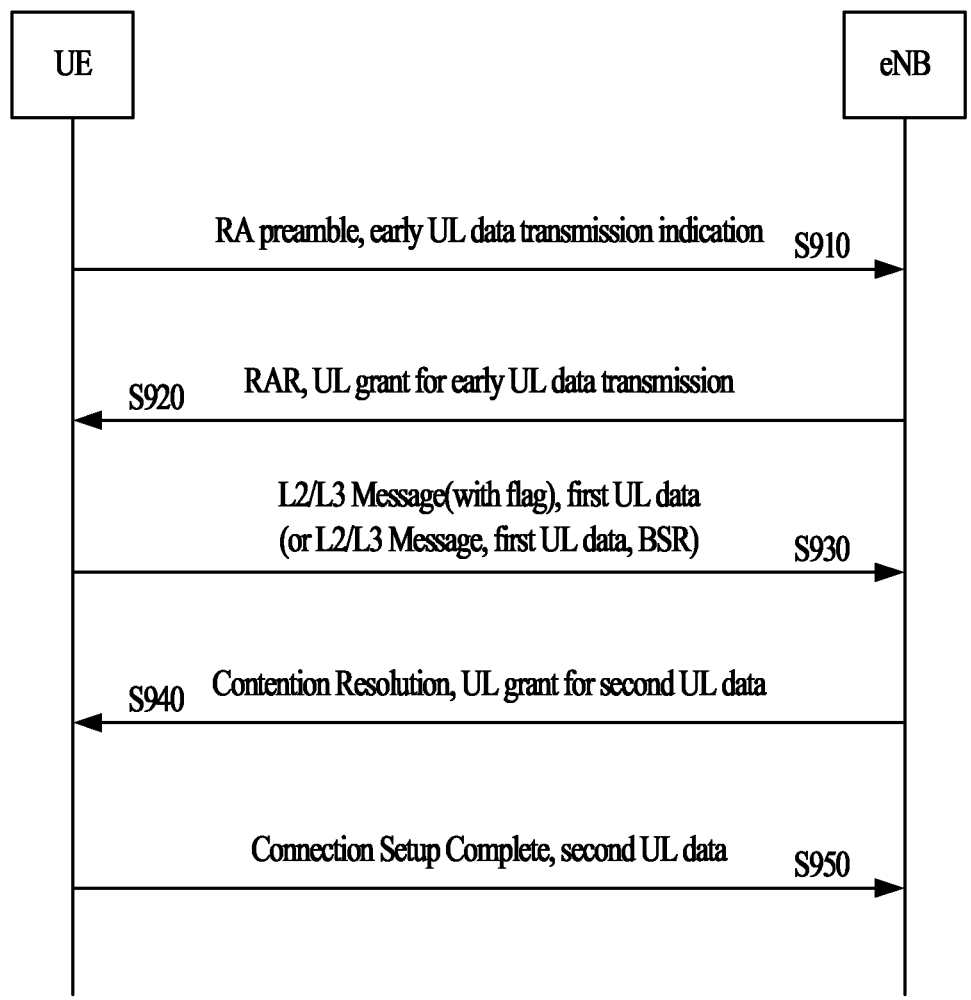

FIG. 9 illustrates a random access procedure for early UL data transmission in the Msg3/Msg5 step according to the present invention. In FIG. 9, steps S910 and S920 correspond to steps S810 and S820 of FIG. 8, respectively, and may be performed in the same/similar manner as steps S810 and S820 of FIG. 8.

In step S930, the UE may transmit early UL data along with the L2/L3 message. If the size of the early UL data to be transmitted in step S930 is larger than the resource allocated through the Msg2 step (e.g., the UL grant information for early UL data transmission in step S920), the UE may transmit a portion (or the first UL data) of the early UL data in step S930. Data having a smaller size than the resource allocated through the Msg2 step (e.g., the UL grant information for early UL data transmission in step S920) may be referred to as small UL data. Data having a larger size than the resource allocated through the Msg2 step (e.g., the UL grant information for early UL data transmission in step S920) may be referred to as large UL data.

In the Msg3 step, small UL data is transmitted along with the conventional L2/L3 message. In order to transmit large UL data, the UE additionally transmits, in the Msg3 step, flag information indicating presence of UL data (or second UL data) to be additionally transmitted. The flag information may be transmitted through the L2/L3 message, which is transmitted in the Msg3 step. Alternatively, the UE may transmit a buffer status report (BSR), which may take the role of the flag information, along with the L2/L3 message. Alternatively, the flag information through the L2/L3 message and the BSR may be operated independently. In this case, the UE may transmit the flag information through the L2/L3 message and the BSR together in the Msg3 step.

The BSR represents a MAC message indicating information about the amount of data in the buffer of the UE. The BSR may include information indicating the buffer size of the UE. When the BSR indicates a buffer size other than 0, the BSR may indicate that there is additional UL data to be transmitted. When the BSR indicates a buffer size as 0, the BSR may indicate that there is no additional UL data to be transmitted. When the BSR indicates that there is no additional UL data to be transmitted, operations after the Msg4 step may be performed in the same manner as described with reference to FIG. 8.

When the eNB receives the flag information (and/or the BSR) indicating whether there is additional UL data (or second UL data), the eNB recognizes that there is additional UL data to be transmitted, and transmits UL grant information about the additional UL data along with a contention resolution message including UE identification information (or UE ID). When the UE receives its UE identification information (or UE ID) in Msg4, it transmits the additional UL data in the Msg 5 step (e.g., step S950) using the UL grant information received.

As another method of enabling additional data to be received, it is proposed that an RRC connection setup request or an RRC connection resume request be performed in the Msg3 step instead of the flag information indicating that there is additional UL data, and data be transmitted and received by switching to the RRC connected state.

In the two proposed methods, a UE transmits a large data packet by dividing the packet into a small data packet (or first UL data) and an additional data packet (or second UL data). The methods may be used to transmit urgent data in the Msg3 step and transmit the remaining additional information in or after Msg5.

Method 3: Early UL Data Transmission in Msg1 Step

In order to support a timing critical mobile exception report, a method of transmitting early UL data in the Msg1 step is proposed. Method 3 may be carried out in addition to Method 1 or Method 2 according to the present invention or may be carried out in place of Method 1 or Method 2.

Figure 10:
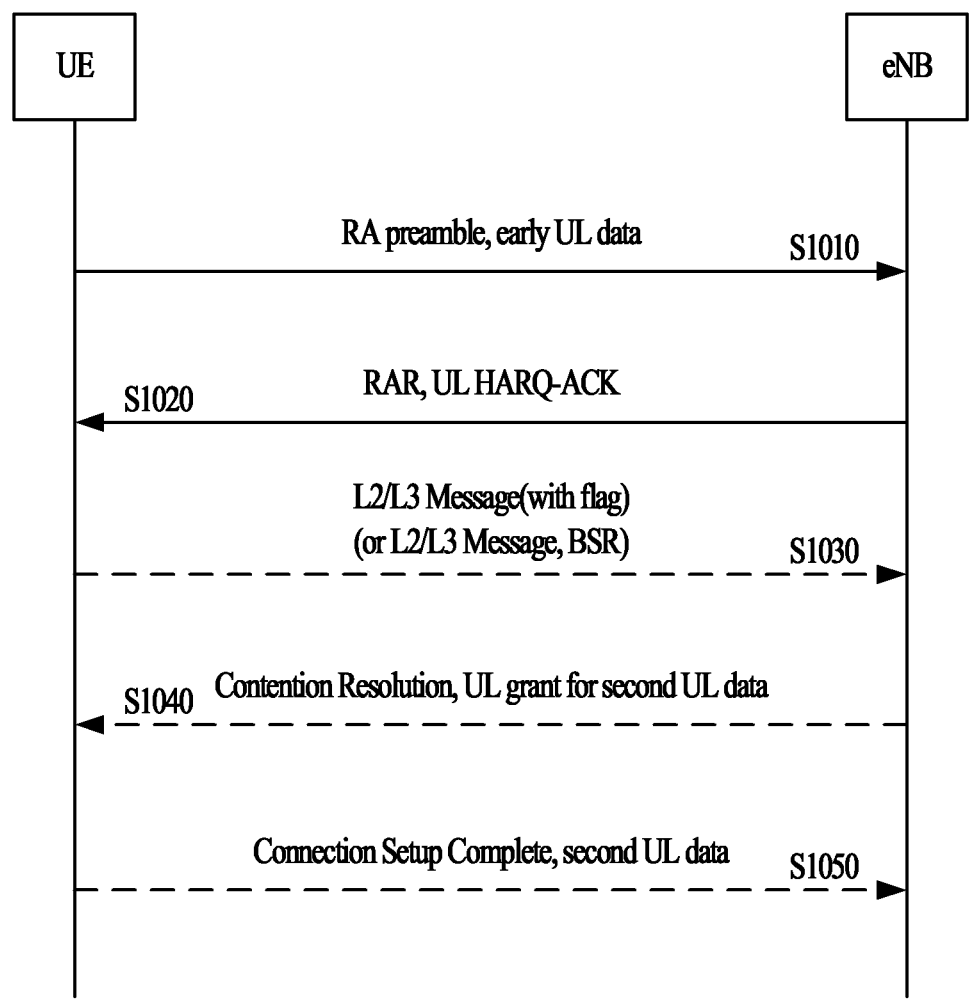

FIG. 10 illustrates a random access procedure according to Method 3 of the present invention.

Referring to FIG. 10, in the Msg1 step (e.g., step S1010) of the random access procedure, early UL data may be transmitted along with an RA preamble through the (N)PUSCH. The eNB may transmit a UL HARQ-ACK along with the RAR in the Msg2 step (e.g., step 1020). When the UE normally receives the ACK in the Msg2 step, the eNB may return to the battery efficient state or attempt to transmit additional UL data. When the eNB returns to the battery efficiency state, steps S1030 to S1050 of FIG. 10 are skipped. When additional UL data transmission is attempted, steps S1030 to S1050 of FIG. 10 may be performed. Steps S1030 to S1050 may be performed in the same manner as steps S930 to S950, respectively.

To indicate early UL data transmission in the Msg1 step (e.g., step S1010), the same method as the method (see, for example, Opt1 to Opt5) by which the UE indicates early UL data transmission in Msg3 to the eNB in the Msg1 step may be used. Since bits indicated to the eNB through Msg1 may be limited, only presence/absence of (N)PUSCH transmission may be indicated in the Msg1 step, and MCS/TBS may be fixed or have a value determined in conjunction with the RSRP calculated by the UE or a coverage level based on the RSRP. Alternatively, the (N)PUSCH MCS/TBS information may be configured by SIB information.

The eNB may be configured to transmit early DL data in the Msg2 step (e.g., step S1020) of FIG. 10. When the early DL data is to be transmitted in the Msg2 step, the same method as the method (see, for example, Opt1 to Opt5) by which the UE indicates early UL data transmission in Msg3 to the eNB in the Msg1 step may be used to indicate early DL data transmission to the UE. Alternatively, to indicate early DL data transmission in the Msg2 step, a specific RNTI may be used in Msg2 transmission, or a reserved bit in (N)PDCCH DCI corresponding to the (N)PDSCH that carries the early DL data may be used. In the Msg2 step, power/repetition/RU for early DL data transmission may be determined in conjunction with an RSRP value measured by the UE or a coverage level based thereon.

In the case where early DL data transmission is indicated using a specific RNTI, an RNTI value not designated for a specific use may be used. For example, the RNTI may be expressed as four hexa-decimal values. In the current standard, the values from FFF4 to FFF9 are reserved rather being allocated for a specific use. Therefore, one of FFF4 to FFF9 may be assigned to the specific RNTI.

In the case where the reserved bits of the DCI transmitted through the (N)PDCCH is used, one of the reserved bits may be pre-designated, and the designated reserved bit may be set to a specific value to indicate the early DL data transmission to the UE. As an example, when DCI format 1A is used, a specific one of the reserved bits (e.g., the first or last one of the reserved bits, the HARQ processor number field, or the Downlink Assignment Index (DAI) field) of DCI format 1A may be set to a specific value (e.g., 1) to indicate early DL data transmission to the UE. As another example, when DCI format N1 is used, a specific one of the reserved bits (e.g., the first or last one of the reserved bits, or a New Data Indicator (NDI) bit, or an ACK/NACK Resource Indictor (ARI) field) of DCI format N1 may be set to a specific value (e.g., 0) to indicate early DL data transmission to the UE.

The above-described method for indicating early DL data transmission by the eNB may be applied to the Msg2 step (e.g., step S820 or step S920) of FIG. 8 or 9 in the same manner.

Requirements for reducing latency and power consumption may vary depending on the use case, cell size, or UE situation. In this respect, it is proposed that the UE determine whether to transmit/receive UL/DL data after completion of the random access procedure as in the conventional method or to perform early UL/DL data transmission during the random access procedure, or more precisely, in which step of the random access procedure the early UL/DL data is to be transmitted. The UL data transmission is allowed in or after Msg1/Msg3/Msg5, and the DL data transmission is allowed after Msg2/Msg4 or Msg5. An RSRP value measured by the UE or a coverage level based on RSRP (or the number of repetitive transmissions of an RA preamble) may be taken into consideration as a criterion for determining whether to perform early UL/DL data transmission during the random access procedure or determining a step in which early UL/DL data transmission is to be performed. The threshold of the RSRP or coverage level for determining early UL/DL data transmission may be set to a predetermined value or configured through the SIB.

For example, only a UE having an RSRP that is at or above a certain level (e.g., a threshold value) or a UE having a corresponding coverage level may be allowed to perform early UL/DL data transmission during the random access procedure. When the UE determines whether to transmit early UL/DL data during the random access procedure as described above, the UE may indicate the transmission to the eNB in the Msg1 step. As the indication method, a method same as the method (see, for example, Opt1 to Opt5) by which the UE indicates early UL data transmission of Msg3 to the eNB in Msg1 may be used.

The eNB may transmit (N)PUSCH scheduling information for the Msg3 step in the Msg2 step according to the RSRP or coverage level selected by the UE. In this case, interpretation of the PUSCH scheduling field through Msg2 may vary depending on the RSRP or coverage level selected by the UE or whether the UE has indicated early UL data transmission. That is, when the early UL data transmission is performed, a larger TBS, a larger number of RBs, a larger number of repetitions, a higher modulation order may be set than when the early UL data transmission is not performed. A grant-free random access procedure, in which no grant information is used, may be selected to reduce latency and power consumption or to accommodate a high connection density. In the same way, the UE may select the grant-free random access procedure using the RSRP or coverage level.

As a method of indicating, by the UE, the early UL data transmission of the Msg3 step to the eNB in the Msg1 step, it has been proposed that the indication be distinguished using a time/frequency resource of a PRACH or NPRACH (see, for example, Opt1) or a frequency hopping pattern (see, for example, Opt2), or by allocating non-anchor PRB(s) (see, for example, Opt3), multiplying each preamble symbol or preamble symbol group by an orthogonal cover code (see, for example, Opt4), or partitioning a preamble sequence (see, for example, Opt5). In addition, as mentioned above, the above-described methods (e.g., Opt1 to Opt5) may be applied even to a method of additionally transmitting a few bits using a random access preamble for another purpose. Using the above-described methods of transmitting a few bits using a random access preamble, the following information may be delivered to the eNB:

A random access method (whether the procedure is a contention-based procedure or a contention-free procedure);

Whether to support early data transmission during the random access procedure (more specifically, an early data transmission execution step);

A quantized value of the RSRP measured by the UE or a coverage level based thereon;

Early data transmission packet size (e.g. whether the packet is sufficient to be transmitted in the Msg3 step or additional data transmission is needed);

Msg2 transmission method (indication of whether transmission is performed using only NPDCCH or NPDSCH unlike the conventional method);

Msg3 transmission method (an Msg3 transmission method determined by the UE: e.g., single-tone/multi-tone, power/repetition/RU setting, resource allocation);

Method 4: Random Access Method for Mobile Exception Report

As described above, as a main scenario of cellular IoT, the UE may support operations such as mobile exception report, mobile periodic report, network command, software update/reset, and the like. For example, the UE may need to perform the mobile exception report, which is aperiodic and takes latency as a significant factor, and the mobile periodic report, which is periodic, simultaneously. In this case, in order to perform the mobile exception report and the mobile periodic report efficiently, the UE may stay in the battery efficiency state and wake up upon occurrence of an event or in specific subframe(s) within a certain period to perform UL/DL data transmission and reception. In order to avoid collision between UEs, the above-mentioned specific subframe(s) may be UE-specifically configured using the IMSI of the UE, which is referred to as a paging occasion (PO) because it is mainly used for periodic checking of paging. When a mobile exception report is suddenly generated and thus a UE configured to periodically send a report in a PO needs to send the report, a (aperiodic/periodic/grant-free) random access method may be selectively used according to a situation.

FIG. 11(a) illustrates a paging cycle, FIG. 11(b) illustrates an (e)DRX cycle.

Referring to FIG. 11(a), the eNB UE-specifically configures at least one PO in every specific paging period, and enables the UE to acquire a paging message in the UE-specifically configured PO. The paging period may refer to a period during which the paging message is transmitted. The UE in the RRC-IDLE or RRC-SUSPENDED mode may return to the connected mode in a PO configured therefor and receive a paging message. The UE-specific PO may be determined using parameters signaled via SIB2 and UE identification information (e.g., IMSI).

Referring to FIG. 11(b), discontinuous reception (DRX) may be configured by the eNB to reduce power consumption. When DRX is configured in the connected mode, the UE may repeat the sleep mode and the wakeup mode according to the DRX cycle configured by the eNB. The DRX cycle may not be aligned with the paging cycle. When the PO of the UE in which the DRX is configured is positioned in the sleep period of the DRX cycle, the UE may switch to the wakeup mode to receive the paging message. In the case of NB-IoT, a DRX cycle having a significantly extended sleep period may be used to reduce power consumption, and may be referred to extended DRX or enhanced DRX (eDRX).

In Method 4 of the present invention, when (e)DRX is used to reduce power consumption, an (aperiodic/periodic/grant-free) random access procedure may be performed if a mobile exception report is generated. Method 4 may be applied to Method 1 to Method 3 of the present invention.

4-1. Immediate (Aperiodic) Reporting Regardless of the PO or the Wakeup Period

For the time critical event, reporting is likely to be obsolete if the event is not reported immediately. Therefore, in Method 4-1, the UE may report UL data immediately to report the event even if the UE is not in the PO and/or wakeup period thereof.

4-2. Aperiodic or Periodic Method Selection Based on a Distance from the PO or Wakeup Period (Determined Based on the Counter or Timer Value)

When the timer value at the PO start point (current timer value) is less than a certain threshold, the UE may be assigned a resource in the PO through a scheduling request (SR) and report UL data. Since the UL data is reported in the PO, this method corresponds to a periodic method.

When the timer value at the PO start point (current timer value) is greater than the certain threshold, UL data may be reported immediately through the RRC connection setup/resume procedure. Since the reporting is performed regardless of the PO or wakeup period, this method corresponds to a non-periodic method.

In Method 4-2, the threshold may be a fixed value or may be configured via SIB.

4-3. Selection According to the Characteristics of the UE or the Reported Data

The periodic reporting method may be suitable for a periodic reporting UE. Therefore, a UE, such as a UE for the periodic report, may transmit UL data in the PO configured therefor. On the other hand, an aperiodic method may be suitable for a UE for the exception (urgent) report, and thus may immediately transmit UL data regardless of the PO configured therefor.

The methods described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the methods of the present invention may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present invention or included as a new claim by a subsequent amendment after the application is filed.

Figure 12:
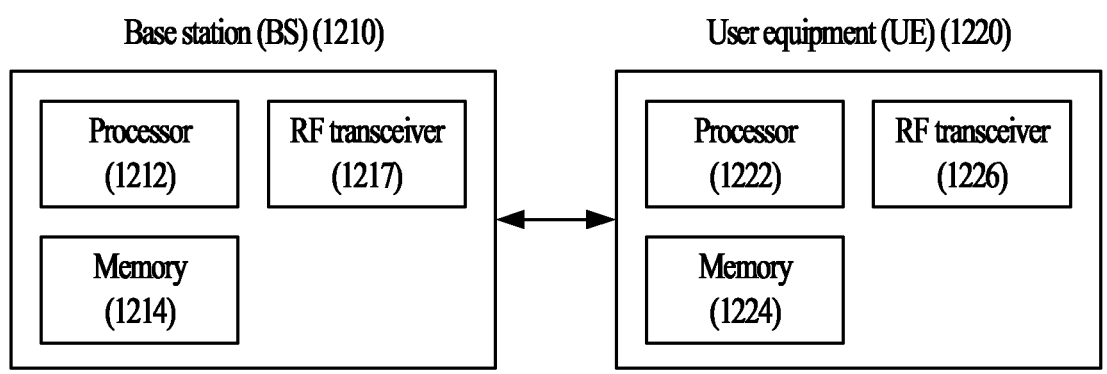
FIG. 12 illustrates a base station and a user equipment to which the present invention is applicable.

FIG. 12 illustrates a BS and a UE to which the present invention is applicable.

Referring to FIG. 12, a wireless communication system includes the BS 1210 and the UE 1220. When the wireless communication system includes a relay, the BS 1210 or the UE 1220 may be replaced with the relay.

The BS 1210 includes a processor 1212, a memory 1214, and a radio frequency (RF) transceiver 1216. The processor 1212 may be configured to embody the procedures and/or methods proposed by the present invention. The memory 1214 is connected to the processor 1212 and stores various pieces of information associated with an operation of the processor 1212. The RF transceiver 1216 is connected to the processor 1212 and transmits/receives a radio signal. The UE 1220 includes a process 1222, a memory 1224, and an RF transceiver 1226. The processor 1222 may be configured to embody the procedures and/or methods proposed by the present invention. The memory 1224 is connected to the processor 1222 and stores various pieces of information associated with an operation of the processor 1222. The RF transceiver 1226 is connected to the processor 1222 and transmits/receives a radio signal.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present invention may be implemented in the form of a module, a procedure, a function, etc. which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method for performing a random access procedure by a user equipment in a wireless communication system, the method comprising:
   transmitting, as a message-1 (Msg1) of the random access procedure, a random access preamble to a base station, wherein the random access preamble indicates an early uplink data transmission in a message-3 (Msg3) during the random access procedure; and
   receiving, as a message-2 (Msg2) of the random access procedure, a random access response message including first information and second information from the base station, wherein the first information includes uplink grant information, and the second information includes a flag indicating whether the uplink grant information is for the early uplink data transmission in the Msg3; and
   transmitting the Msg3 to the base station using the first information including the uplink grant information, wherein the Msg3 transmission includes the early uplink data transmission based on that the flag of the second information indicates the uplink grant information is for the early uplink data transmission.

2. The method of claim 1, wherein transmitting the random access preamble comprises:
   indicating the early uplink data transmission in the Msg3 by transmitting the random access preamble using a pre-designated Physical Random Access Channel (PRACH) time resource and frequency resource.

3. The method of claim 1, wherein transmitting the random access preamble comprises:
   indicating the early uplink data transmission in the Msg3 by transmitting the random access preamble using a pre-designated Physical Random Access Channel (PRACH) frequency hopping pattern.

4. The method of claim 1, wherein transmitting the random access preamble comprises:
   indicating the early uplink data transmission in the Msg3 by transmitting the random access preamble using a pre-designated Physical Random Access Channel (PRACH) non-anchor Physical Resource Block (PRB).

5. The method of claim 1, wherein transmitting the random access preamble comprises:
   indicating the early uplink data transmission in the Msg3 by multiplying a preamble symbol or a preamble symbol group of the random access preamble by a pre-designated orthogonal cover code.

6. The method of claim 1, wherein transmitting the random access preamble comprises:
   indicating the early uplink data transmission in the Msg3 step by partitioning a preamble sequence of the random access preamble.

7. The method of claim 1, wherein the transmission of the Msg3 and uplink data transmission are performed through a same Physical Uplink Shared Channel (PUSCH) based on that the flag of the second information indicates the uplink grant information is for the early uplink data transmission.

8. The method of claim 1, wherein the transmission of the Msg3 and uplink data transmission are performed through different Physical Uplink Shared Channels (PUSCHs) based on that the flag of the second information does not indicate the uplink grant information is for the early uplink data transmission.

9. The method of claim 1, wherein the random access response message is received through a Physical Downlink Control Channel (PDCCH) not involving a Physical Downlink Shared Channel (PDSCH).

10. The method of claim 1, wherein the random access response message is received through a Physical Downlink Shared Channel (PDSCH) not involving a Physical Downlink Control Channel (PDCCH).

11. The method of claim 1, further comprising:
    receiving a radio resource control (RRC) connection setup message from the base station; and
    based on the RRC connection setup message not including identification information of the user equipment, performing a Hybrid Automatic Repeat and Request (HARD) operation for the early uplink data transmission.

12. The method of claim 11, further comprising:
    based on a contention resolution message including the identification information of the user equipment, entering an RRC-IDLE mode.

13. A device for wireless communication, the device comprising:
    a memory configured to store instructions; and
    a processor configured to perform operations by executing the instructions,
    wherein the operations performed by the processor comprises:
        transmitting, as a message-1 (Msg1) of a random access procedure, a random access preamble to a base station, wherein the random access preamble indicates an early uplink data transmission in a message-3 (Msg3) during the random access procedure; and receiving, as a message-2 (Msg2) of the random access procedure, a random access response message including first information and second information from the base station, wherein the first information includes uplink grant information, and the second information includes a flag indicating whether the uplink grant information is for the early uplink data transmission in the Msg3; and transmitting the Msg3 to the base station using the first information including the uplink grant information, wherein the Msg3 transmission includes the early uplink data transmission based on that the flag of the second information indicates the uplink grant information is for the early uplink data transmission.

14. The device of claim 13, further comprising:
a Radio Frequency (RF) transceiver operatively connected to the processor.

15. The device of claim 13, wherein the device is a user equipment or a mobile terminal configured to perform 3rd generation partnership project (3GPP)-based wireless communication.

16. The device of claim 13, wherein the device is an application specific integrated circuit (ASIC) or a digital signal processing device.

17. A non-transitory medium readable by a processor and recorded thereon instructions cause the processor to perform the method of claim 1.

18. A method for wireless communication by a base station, the method comprising:

receiving, as a message-1 (Msg1) of a random access procedure, a random access preamble from a user equipment, wherein the random access preamble indicates an early uplink data transmission in a message-3 (Msg3) during the random access procedure; and transmitting, as a message-2 (Msg2) of the random access procedure, a random access response message including first information and second information to the user equipment, wherein the first information includes uplink grant information, and the second information includes a flag indicating whether the uplink grant information is for the early uplink data transmission in the Msg3; and receiving the Msg3 from the user equipment based on the first information including the uplink grant information, wherein the Msg3 is related to the early uplink data transmission of the user equipment based on that the flag of the second information indicates the uplink grant information is for the early uplink data transmission.

19. A device for wireless communication, the device comprising:

a memory configured to store instructions; and a processor configured to perform operations by executing the instructions, wherein the operations performed by the processor comprises:

receiving, as a message-1 (Msg1) of a random access procedure, a random access preamble from a user equipment, wherein the random access preamble indicates an early uplink data transmission in a message-3 (Msg3) during the random access procedure; and transmitting, as a message-2 (Msg2) of the random access procedure, a random access response message including first information and second information to the user equipment, wherein the first information includes uplink grant information, and the second information includes a flag indicating whether the uplink grant information is for the early uplink data transmission in the Msg3; and receiving the Msg3 from the user equipment based on the first information including the uplink grant information, wherein the Msg3 is related to the early uplink data transmission of the user equipment based on that the flag of the second information indicates the uplink grant information is for the early uplink data transmission.

* * * * *